United States Patent [19]

Wecker, Sr.

[11] 4,043,916

[45] Aug. 23, 1977

[54] ON-LINE CLOSED-VESSEL CIRCULATING FILTER FOR EDIBLE COOKING OILS

[75] Inventor: Walter A. Wecker, Sr., Delray Dunes, Boynton Beach, Fla. 33436

[73] Assignee: Wacker-Dearborn Corporation, Chicago, Ill.

[21] Appl. No.: 696,650

[22] Filed: June 16, 1976

[51] Int. Cl.² .............................................. B01D 35/28

[52] U.S. Cl. .................................... 210/238; 210/167; 210/455; 210/479; 210/DIG. 8

[58] Field of Search ............... 210/232, 237, 406, 416, 210/455, 477, 479, 482, 489, DIG. 8, 238, 167

[56] References Cited

U.S. PATENT DOCUMENTS

| | | | |
|---|---|---|---|
| 3,085,689 | 4/1963 | Hering et al. | 210/445 X |
| 3,337,055 | 8/1967 | Starnes et al. | 210/482 X |
| 3,768,654 | 10/1973 | Pearce | 210/455 X |
| 3,849,312 | 11/1974 | Wecker, Sr. | 210/455 X |

*Primary Examiner*—Frank W. Lutter
*Assistant Examiner*—William A. Cuchlinski, Jr.
*Attorney, Agent, or Firm*—Olson, Trexler, Wolters, Bushnell & Fosse, Ltd.

[57] ABSTRACT

An on-line closed-vessel circulating filter is especially adapted for filtering edible cooking oils and the like in fast-food establishments and similar installation. The filter apparatus includes a vessel and cover which enclose a filter assembly. The filter assembly is provided with a foraminous member which supports a filter element. To hold the filter element in place and retain filter aid material and filtrate on the filter element, a gravity clamp member presses the filter element against the foraminous member by inner and outer weight rings. The filter assembly can be removed and replaced by a centrally located lift rod.

5 Claims, 3 Drawing Figures

ON-LINE CLOSED-VESSEL CIRCULATING FILTER FOR EDIBLE COOKING OILS

BACKGROUND OF THE INVENTION

This invention relates generally to equipment for use in fast-food establishments and the like. More particularly, the invention has reference to vacuum filtering apparatus for reconditioning deep-fat frying oils.

During use in commercial and institutional cooking operations, deep-frying oils become contaminated with such things as moisture and carbonized food particles. Fatty acids are also split chemically from the oil; and the oil itself may oxidize or become rancid and may absorb undesirably odorous essences from the food being cooked. In order to maximize the utility of deep-frying apparatus and the cooking oil used therein, it is desireable to recondition the oil in continuation of the cooking operation or at least while the oil is at or near the cooking temperature.

Special vacuum filtering apparatus have been developed in the past to accomplish this aim. These prior art devices commonly employ a replaceable filter element made of paper or other suitable fiber in conjunction with a quantity of a particulate filter aid or media, such as diatomaceous earth. However, considerable time and effort are required to replace the assembled prior art filter beds when they become clogged with carbonized food particles and other debris. Such change-overs ordinarily require that the accompaning fryer be put out of service for a substantial period of time while the filter bed is being renewed.

An important object of the present invention is therefore to obviate the above-described inefficiency and provide vacuum filtering apparatus for cooking oils in which the filter bed can be rapidly replaced.

A more general object of the invention is the provision of new and improved apparatus for filtering edible cooking oils.

Another object is to provide vacuum filtering apparatus that is arranged for substantially continuous reconditioning of the cooking oil used in a deep-fat fryer coupled in fluid circuit with the filtering apparatus.

Still another object is to provide a filtering apparatus that is arranged for replacement of a clogged filter bed with a completely pre-assembled filter bed unit.

These and other objects and advantages of the invention will become apparent upon reading the following detailed description and upon reference to the drawings. Throughout the drawings, like reference numerals refer to like parts.

DETAILED DESCRIPTION

Figure 1:
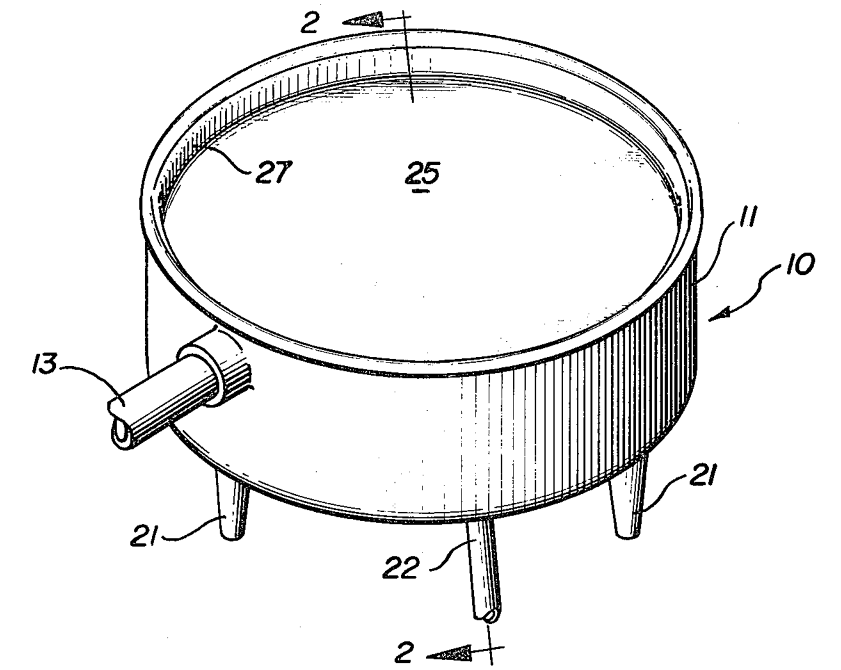
FIG. 1 is a perspective view showing an embodiment of the invention in its general aspect.

While the invention will be described in connection with a preferred embodiment, it will be understood that it is not intended to limit the invention to this embodiment. On the contrary, it is intended to cover all alternatives, modifications, and equivalents included within the spirit and scope of the invention as defined by the appended claims.

Turning more specifically to the drawings, there is shown a vacuum filtering apparatus 10 emboding the present invention. This apparatus can be considered to generally include a vessel 11 which is provided with a fluid inlet 12 supplied by appropriate piping 13 for leading oil or the like from a deep-fat fryer (not shown) or other source of contaminated fluid. If desired, a valve (not shown) on the inlet piping 13 is so disposed that its handle prevents removing the vessel cover while the valve is in its open, fluid-flow permitting configuration. When the valve handle is located in a fluid-flow-stop position, the valve handle is turned to a position permitting vessel cover removal, and also provides a bleed from the atmosphere, thereby relieving any negative pressure or vacuum within the vessel before the cover is removed. The inlet 12 includes an elongated throat 14 having an oblong cross section at the vessel wall 11 which is of greater area than the inlet circular cross section to encourage smooth, unpressurized fluid inflow.

Filtered oil is drawn from the vessel 10 at an outlet 16 through return vacuum-maintaining suction piping 17 to the fryer or other downstream device. To obtain the assistance of gravity in filtering, this vessel outlet 16 is disposed at a lower gravitational level than the vessel inlet 12. Filtering action occurs at a filter bed assembly 18 located between the inlet 12 and the outlet 16. The assembly 18 can be quickly and easily lifted out of the vessel 11 — and replaced inside the vessel after renewal — by an upstanding centrally located lift rod 19. Support legs 21 can be attached to the vessel 11 by any convienient means so as to elevate the outlet 16 sufficiently to permit attachment of the exhaust or outlet piping 17.

To close the vessel 11, a suitable cover 25 is provided; a handle (not shown) of convenient shape and design can be secured to the cover 25 to permit its easy removal if desired. Proper oil flow control and displacement is encouraged, in accordance with one feature of the invention, by providing the cover 25 with an inwardly recessed lid portion 26 which terminates in upstanding walls 27. To enhance and maintain a filter-action-encouraging vacuum within the vessel 10, this annular wall 27 is reversely turned at its free margin to define a gasket seat 28. A gasket 29, which can be of the "0-ring" type, is carried within the reverse turn 28 and is thus located for sealing cooperation between the vessel 11 and the cover 25.

Figure 2:
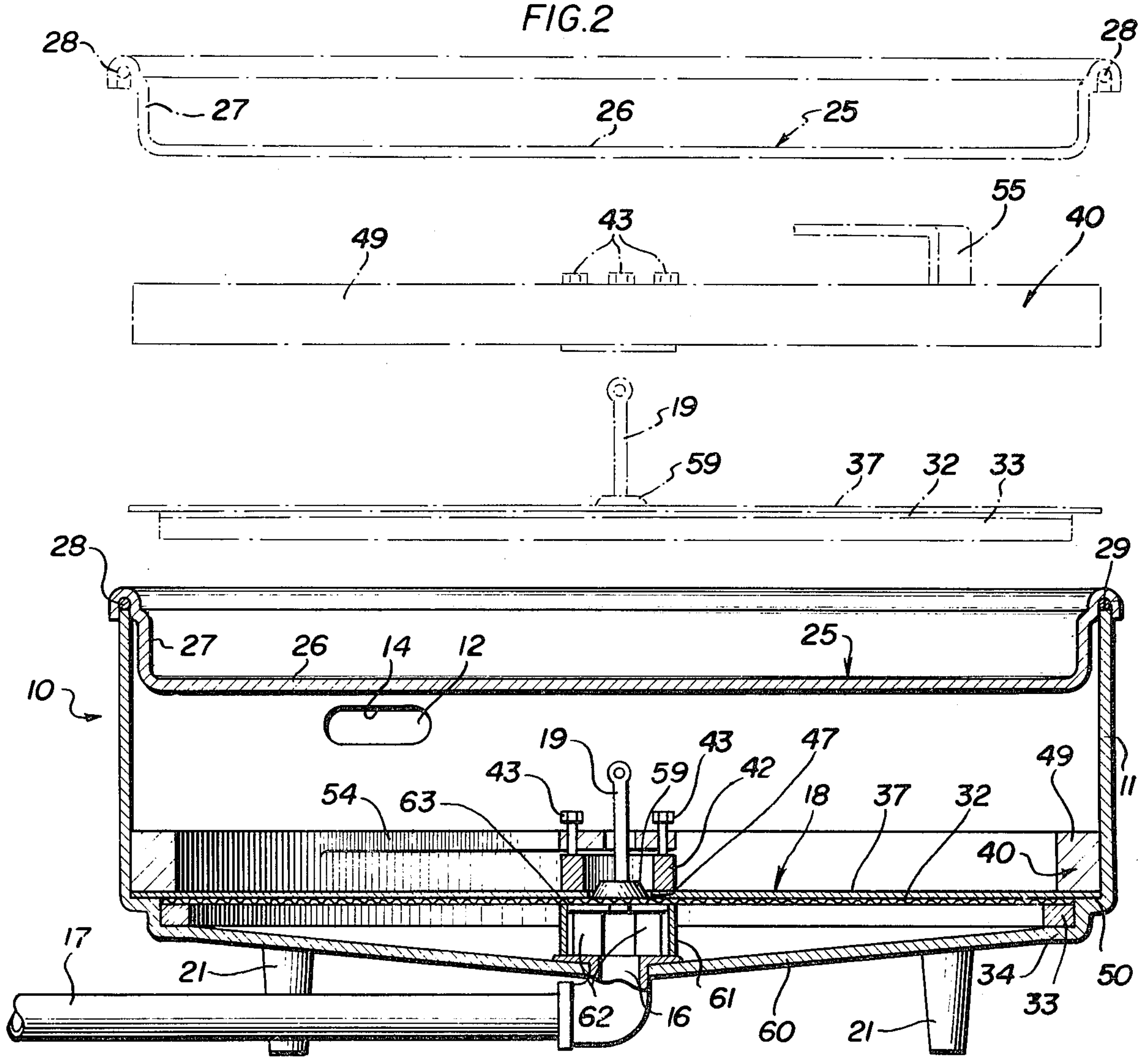
FIG. 2 is a sectional view taken substantially in the plane of line 2—2 in FIG. 1.

In accordance with the invention, the filter bed assembly 18 can be manipulated as a unit to permit quick filter cleaning and replacement and to minimize filter out-of-service time. This filter assembly includes a foraminous member or screen 32 which is provided with peripheral rigidity by a depending annular support 33 sized and adapted to nest within and upon an annular vessel shoulder 34 as particularly illustrated in FIG. 2.

To provide full yet fine filtering action, the screen or foraminous member 32 supports a porous filter element 37. This filter element 37 can be formed of commercially available filter paper or other suitable material. In the preferred embodiment of the invention, a layer of diatomecious earth (not shown) is provided over the filter paper or filter element 37.

In accordance with the invention, the filter paper element 37 is retained in a stable, flat, operating condition within the unit 10 during filter operations. In addition the diatomaceous earth and/or filtrate is retained on the filter element 37, and is not permitted to escape around the filter margins and through the filtering unit exhaust 16. To this end, a weight ring or gravity clamp member 40 is adapted to fit within the walls of the filter vessel 11.

A depressing, compressing action is directed against the filter element 37 and its edges by forming this clamping element 40 of suitable weight and shape: here, a first annular weight dement 42 is attached to the gravity clamp 40, as by bolts or other suitable devices 43 adjacent the central lift rod 19 in a position to immobilize inner margins 47 of the annular filter element 37 and retain particulate filter aid material and filtrate over the filter element 37 itself. A second weight element 49, radially spaced from the first weight element 42, depressively secures outer filter element margins 50 in the illustrated locations and prevents filter aid material and filtrate from falling or leaking past the filter margins 50 and shoulder 34 and into the exhaust 16.

Figure 3:
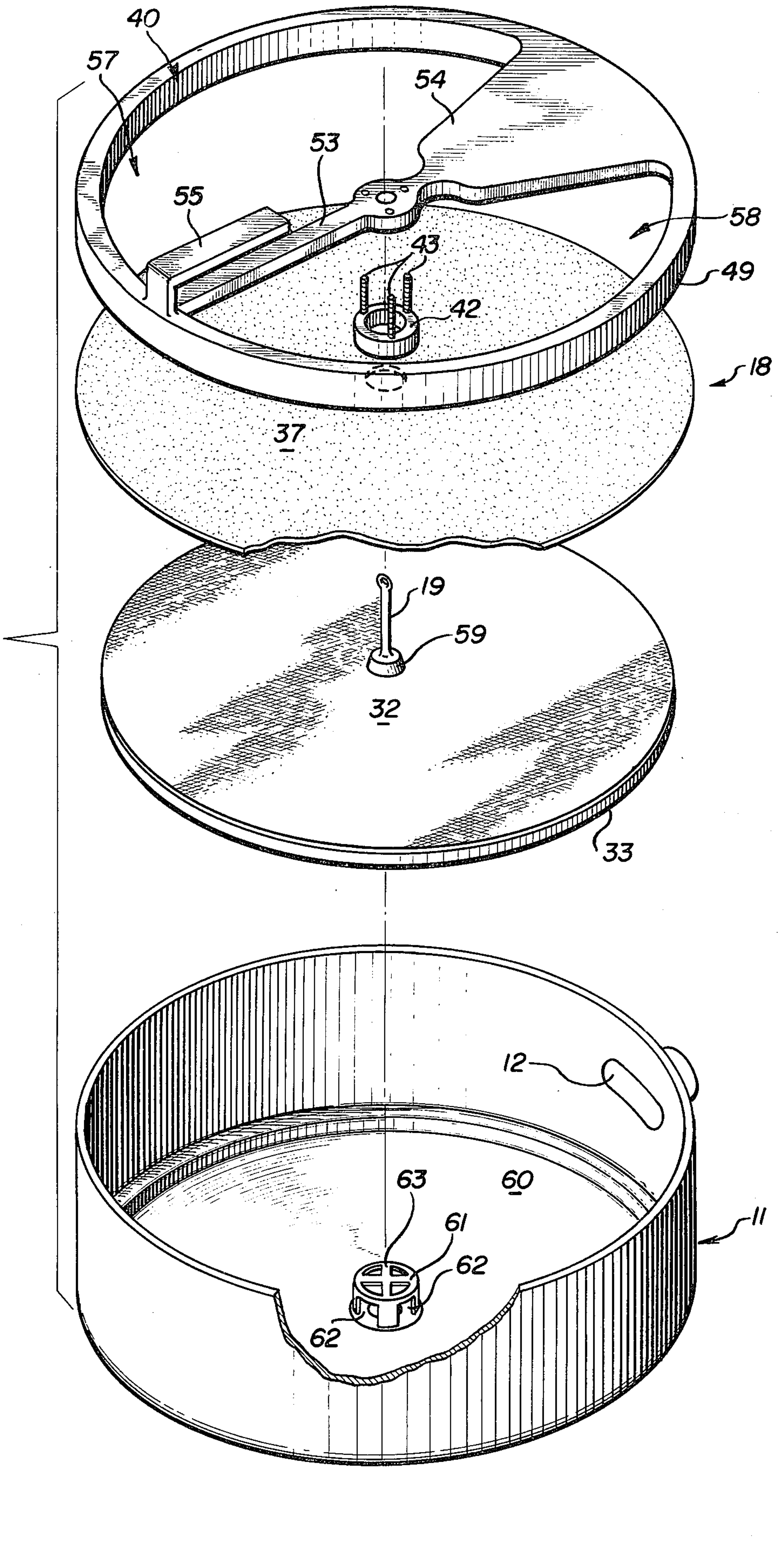
FIG. 3 is an exploded view showing in yet further detail major portions of the novel filter.

The weight elements 42 and 49 are connected together by spanner elements 53 and 54 for movement and manipulation of a unit. As illustrated particularly in FIG. 3, these spanner elements 53 and 54 can be of the radial-arm variety; if desired, one or more elements 54 can be angularly extended to provide a splash-plate action for fluid entering the unit through the inlet 12. A clamp ring lift handle 55 is provided to encourage quick and easy clamp ring removal and replacement when manipulation and renewal of the filter unit assembly 18 is desired. Together, these spanners 53 and 54 and the handle 55 are sized and shaped to define open regions 57 and 58 between the weight elements 42 and 49, thereby exposing the foraminous member 32 and the filter element 37 for filtering action.

To assist in locating the first weight element 42 when the gravity weight clamp 40 is placed over the filter element 37, the rod 19 terminates in a rod-screen interconnector 59. To guide the filter element 37 and the weight 42 over the rod 19, this interconnector 59 takes the form of a truncated cone.

Filtered fluid is collected and directed to the centrally located exhaust 16 by a conically shaped bottom 60. To further support the foraminous member 32 and space it apart from the vessel outlet 16 so as to provide good fluid outflow action, a stem member 61 extends upwardly from the bottom 60 and over the exhaust port 16. Unconstricted fluid flow is encouraged by radially located apertures 62 in the stem 61. A screen-supporting top 63 provides support for the central portions of the filter assembly 18.

Vacuum filtering apparatus constructed in accordance with the foregoing description can be easily, quickly and effectively used in fast food establishments and like installation. At a separate location apart from the filtering apparatus 10, a filter assembly 18 can be prepared. First, a filter paper element 37 is placed over the foraminous support member 32. Next, the gravity weight clamping ring 40 is placed over the filter element 37. It will be noted that both the filter element 32 and the clamp ring 40 are automatically located concentrically of the foraminous member 32 during their installationby the central truncated cone guide and interconnector member 59. After the weight clamp member 40 is placed over the filter element 37, filter aid material (such as diatomaceous earth) can be sifted or otherwise placed between the inner and outer concentric weight elements 42 and 49. This newly prepared filter assembly 18 can then be installed within the vessel 11 by simply removing the vessel cover 25, removing any clogged, old filter element 18 present in the vessel by its lift rod 19, and replacing the old assembly 18 with the newly prepared assembly. After the newly prepared assembly 18 is installed, the cover 25 is replaced, and the filter apparatus 10 can be reactivated with a minimum of out-of-service time loss.

The invention is claimed as follows:

1. Vacuum filtering apparatus for use in reconditioning cooking oils comprising a vertically walled filtering vessel an inlet having an oblong cross-section formed in the vessel wall and a throat of circular cross-section smaller than the oblong throat cross-section and formed upstream of the throat, a conical vessel bottom, a centrally located suction outlet disposed at a lower gravitational level than said inlet at the apex of the conical bottom, and horizontally disposed shoulder means for supporting a filter bed assembly between said inlet and said outlet; removable cover means for said vessel; and a filter bed assembly manipulatable as a unit, including a relatively rigid foraminous member supportable at said shoulder means, lift rod means connectable to said foraminous member and having a lift rod upstanding therrefrom, and gravity clamping means for positioning a porous filter element on top of said foraminous member and having a first weight element mountable adjacent said lift rod, a second weight element radially spaced from said first weight element to define open regions therebetween exposing said foraminous member for filtering action, spanner means joining said first and second weight elements, and a one-piece radially apertured stem surrounding the suction outlet and extending upwardly from the suction outlet and vessel bottom sufficiently to support the foraminous member, together with the horizontal shoulder means, in a planar condition in the vessel and to provide, between the shoulder means and the stem, an open annular space encouraging free filtering action.

2. Vacuum filtering apparatus according to claim 1 wherein said first and second weight means each comprise a weight ring for coaction with said filter member.

3. Vacuum filtering apparatus according to claim 1 wherein said cover means includes a portion recessed inwardly of said vessel to define oil displacement means.

4. Vacuum filtering apparatus according to claim 1 wherein one of said weight elements includes vertical extension means to define a collar for retaining particulate filter aid material over said open regions.

5. Vacuum filtering apparatus according to claim 1 which further comprises gasket means operative between said vessel and said cover means to sealingly join said vessel and said cover means and permit creation of a vacuum in said closed vacuum filtering apparatus.

* * * * *